United States Patent
Gan et al.

(10) Patent No.: US 11,026,259 B2
(45) Date of Patent: Jun. 1, 2021

(54) DATA COMMUNICATION METHOD AND APPARATUS

(71) Applicant: Huawei Technologies Co., Ltd., Guangdong (CN)

(72) Inventors: Ming Gan, Shenzhen (CN); Jian Yu, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/220,635

(22) Filed: Dec. 14, 2018

(65) Prior Publication Data
US 2019/0141745 A1    May 9, 2019

Related U.S. Application Data

(63) Continuation of application No. PCT/CN2017/094465, filed on Jul. 26, 2017.

(30) Foreign Application Priority Data

Aug. 25, 2016 (CN) .......................... 201610723606.7

(51) Int. Cl.
*H04W 74/08* (2009.01)
*H04W 76/11* (2018.01)
(Continued)

(52) U.S. Cl.
CPC ... *H04W 74/0808* (2013.01); *H04W 72/0446* (2013.01); *H04W 76/11* (2018.02); *H04W 88/08* (2013.01); *H04W 84/12* (2013.01)

(58) Field of Classification Search
CPC ............. H04W 74/0808; H04W 88/08; H04W 72/0446; H04W 76/11; H04W 84/12; H04W 74/08
See application file for complete search history.

(56) References Cited

U.S. PATENT DOCUMENTS

2009/0190544 A1  7/2009 Meylan et al.
2014/0177514 A1  6/2014 Azizi et al.
(Continued)

FOREIGN PATENT DOCUMENTS

CN  102457350 A  5/2012
CN  103228046 A  7/2013
(Continued)

OTHER PUBLICATIONS

Alfred Asterjadhi et al. LB 205 Comments Resolution Relay Operation, IEEE 802.11-14/1615r1 ,IEEE P802.11 Wireless LANS, Dec. 20, 2014. XP68082491. total 6 pages.
(Continued)

*Primary Examiner* — Tejis Daya
(74) *Attorney, Agent, or Firm* — Kilpatrick Townsend & Stockton LLP (57) ABSTRACT

Embodiments of the present disclosure disclose a data communication method and apparatus. The data communication method includes: when receiving a PPDU, obtaining, by a network node, a BSS identifier in the PPDU; if the BSS identifier in the PPDU is different from a first BSS identifier, and the BSS identifier in the PPDU is the same as a second BSS identifier, determining whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, contending for an access channel, and communicating with a station other than the target relay in the first BSS.

22 Claims, 3 Drawing Sheets

(51) Int. Cl.
*H04W 72/04* (2009.01)
*H04W 88/08* (2009.01)
*H04W 84/12* (2009.01)

(56) References Cited

U.S. PATENT DOCUMENTS

| | | | |
|---|---|---|---|
| 2014/0254471 A1 | 9/2014 | Fang et al. | |
| 2014/0328264 A1 | 11/2014 | Merlin et al. | |
| 2014/0341105 A1* | 11/2014 | Vardhan | H04W 24/02 370/315 |
| 2015/0078299 A1 | 3/2015 | Barriac et al. | |
| 2015/0327265 A1 | 11/2015 | Lee et al. | |
| 2016/0183161 A1 | 6/2016 | Jeong et al. | |
| 2016/0183162 A1 | 6/2016 | Jeong et al. | |
| 2016/0219591 A1 | 7/2016 | Lee et al. | |
| 2016/0345258 A1* | 11/2016 | Zhou | H04W 52/0206 |
| 2017/0064713 A1* | 3/2017 | Barriac | H04L 69/22 |
| 2017/0064739 A1* | 3/2017 | Hedayat | H04L 5/0025 |
| 2017/0142659 A1* | 5/2017 | Noh | H04W 52/0245 |
| 2017/0325178 A1* | 11/2017 | Verma | H04W 52/243 |
| 2017/0374681 A1* | 12/2017 | Kim | H04W 74/08 |
| 2018/0139635 A1* | 5/2018 | Oteri | H04W 74/006 |
| 2018/0242373 A1 | 8/2018 | Wang et al. | |
| 2018/0249501 A1* | 8/2018 | Ko | H04W 84/12 |
| 2018/0332596 A1 | 11/2018 | Lee et al. | |
| 2018/0343580 A1* | 11/2018 | Xiang | H04W 24/08 |

FOREIGN PATENT DOCUMENTS

| | | |
|---|---|---|
| CN | 104053213 A | 9/2014 |
| CN | 104782089 A | 7/2015 |
| CN | 105557054 A | 5/2016 |
| JP | 2016507183 A | 3/2016 |
| KR | 20140070443 A | 6/2014 |
| KR | 20160057444 A | 5/2016 |
| RU | 2010135523 A | 2/2012 |
| WO | 2010011970 A1 | 1/2010 |

OTHER PUBLICATIONS

IEEE P802.11ax™/D0.1, Mar. 2016, Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 6: Enhancements for high efficiency in frequency bands between 1 GHz and 6 GHz, 221 pages.

\* cited by examiner

DATA COMMUNICATION METHOD AND APPARATUS

CROSS-REFERENCE TO RELATED APPLICATIONS

This application is a continuation of International Application No. PCT/CN2017/094465 filed on Jul. 26, 2017, which claims priority to Chinese Patent Application No. 201610723606.7 filed on Aug. 25, 2016. The disclosures of the aforementioned applications are hereby incorporated by reference in their entireties.

TECHNICAL FIELD

The present application relates to the field of wireless network technologies, and in particular, to a data communication method and apparatus.

BACKGROUND

Figure 1:
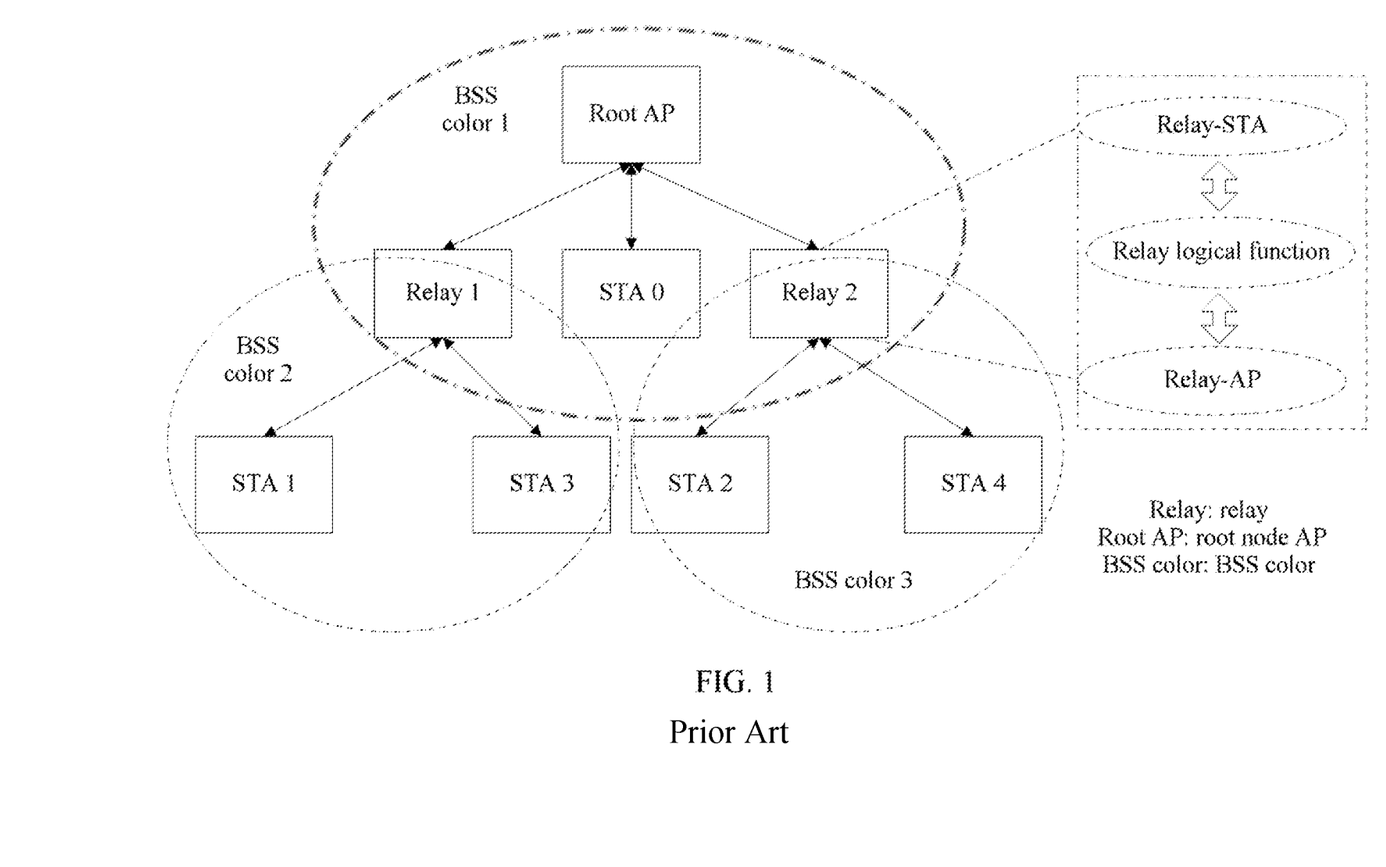
FIG. 1 is a schematic diagram of an application scenario according to an embodiment of the present disclosure.

One objective of a next generation Internet of Things Wireless Fidelity (Wi-Fi) protocol is long-distance transmission. Multi-hop relay transmission is introduced in 802.11ah to achieve long-distance transmission. The relay logically implements two functions: a relay-station (relay-STA) function and a relay-access point (relay-AP) function. When communicating with an associated upper-layer AP, the relay usually acts as a non-access point station, that is, acting as the relay-STA; and when a station managed by the relay communicates with the relay, the relay acts as an access point station, that is, acting as the relay-AP. Each relay and a station managed by the relay are referred to as one basic service set (BSS), and in addition, each relay and an upper-layer AP associated with the relay belong to another BSS. As shown in FIG. 1, a relay 1 and an upper-layer root AP associated with the relay 1 belong to a BSS 1 (the relay acts as the relay-STA in the BSS 1). In addition, the relay 1 and a station managed by the relay 1 (including a STA 1 and a STA 3) are referred to as a BSS 2 (the relay acts as the relay-AP in the BSS 2).

To improve a total system throughput and spectrum utilization, spatial reuse (SR) may usually be performed in BSSs, that is, a plurality of BSSs perform intra-frequency data transmission at the same time. Specifically, when the station receives a data packet from an overlapping BSS (OBSS), the station may contend for a channel to perform SR transmission when a specific SR condition is met.

However, in a relay network, the relay may belong to two BSSs at the same time, for example, the relay 1 in FIG. 1. A relay 1-AP module of the relay 1 belongs to the BSS 2, but a relay 1-STA module belongs to the BSS 1. Conventional concurrent transmission of a plurality of BSSs based on a BSS identifier may cause a transmission collision problem. For example, the relay 1-AP sends a PPDU 1 to the STA 1. In this case, the root AP receives the PPDU 1, but based on that a BSS identifier carried in a physical layer preamble of the PPDU 1 is determined as a PPDU of the OBSS, when the currently received PPDU 1 meets the SR condition, the root AP may contend for a channel and send data to a station managed by the root AP. If the root AP sends the data to the relay 1-STA, but the relay 1 is sending data at this moment, and cannot receive the data at the same time, the data sent by the root AP cannot be received. This causes the data transmission collision problem.

SUMMARY

Embodiments of the present disclosure provide a data communication method and apparatus, so as to resolve a data transmission collision problem that occurs when spatial reuse is performed between different BSSs, and improve resource utilization.

According to one aspect, an embodiment of the present disclosure provides a data communication method, applied to a wireless local area network, where the wireless local area network includes a root access point root AP, a relay, and a station STA, the root AP is associated with a plurality of relays, each of the plurality of relays is associated with one or more STAs, the method is performed by a network node in the wireless local area network, and optionally, the network node may be the root access point root AP, the station STA, or the relay. Optionally, after receiving a physical layer protocol data unit PPDU, a network node obtains a basic service set BSS identifier in the PPDU; if the BSS identifier in the PPDU is different from a first BSS identifier, and the BSS identifier in the PPDU is the same as a second BSS identifier, the network node determines whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, the network node contends for an access channel, and communicates with a station other than the target relay in the first BSS.

In a possible design, if the network node is an access point station in the first BSS, for example, the network node is the root access point root AP, or the network node is the relay, and the relay is a relay-AP in the first BSS, before obtaining the basic service set BSS identifier in the PPDU, the network node may further receive a preset frame reported by a relay, where the preset frame includes an identifier of an extended BSS to which the relay belongs, and the relay and the network node belong to the first BSS. Optionally, the preset frame includes any one of a data frame, a management frame, or a control frame.

In another possible design, if the network node is a non-access point station in the first BSS, for example, the network node is the STA, or the network node is the relay, and the relay is a relay-STA in the first BSS, before obtaining the basic service set BSS identifier in the PPDU, the network node may further receive the management frame, where the management frame carries identifiers of extended BSSs to which all relays in the first BSS belong, and the management frame is broadcast by the access point station in the first BSS to which the network node belongs.

In another possible design, the identifiers that are carried in the foregoing management frame and that are of the extended BSSs to which all the relays in the first BSS belong are identifiers that are pre-reported by the relays in the first BSS to the access point station and that are of extended BSSs to which the relays belong.

In another possible design, if the PPDU includes a spatial reuse prohibition field, before the network node contends for the access channel, the network node reads a value of the spatial reuse prohibition field; determines whether the value of the spatial reuse prohibition field in the PPDU is a spatial reuse prohibition identifier; and if the value of the spatial reuse prohibition field in the PPDU is set to the spatial reuse prohibition identifier, prohibits contention for the channel.

According to another aspect, an embodiment of the present disclosure provides a relay network, where the relay network includes at least two basic service sets BSSs, and BSS identifiers of the at least two BSSs are the same, so that spatial reuse cannot be performed between BSSs of the relay network.

According to another aspect, an embodiment of the present disclosure provides a data communication apparatus, applied to a network node in a wireless local area network, where the wireless local area network includes a root access point root AP, a relay, and a station STA, the root AP is associated with a plurality of relays, and each of the plurality of relays is associated with one or more STAs. The data communication apparatus includes an obtaining unit, a determining unit, and a transceiver unit, where the obtaining unit is configured to: after receiving a physical layer protocol data unit PPDU, obtain a basic service set BSS identifier in the PPDU; the determining unit is configured to: if the BSS identifier in the PPDU is different from a first BSS identifier, and the BSS identifier in the PPDU is the same as a second BSS identifier, determine whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and the transceiver unit is configured to: if the PPDU meets the preset spatial reuse condition, contend for an access channel, and communicate with a station other than the target relay in the first BSS.

According to another aspect, an embodiment of the present disclosure provides a data communication apparatus, applied to any network node in a wireless local area network, where the wireless local area network includes a root access point root AP, a relay, and a station STA, the root AP is associated with a plurality of relays, and each of the plurality of relays is associated with one or more STAs. The data communication apparatus includes a memory, configured to store computer executable program code; a transceiver; and a processor, configured to couple to the memory and the transceiver.

The program code includes an instruction, and when the processor executes the instruction, the instruction enables the data communication apparatus to perform the following operations: when receiving a physical layer protocol data unit PPDU, obtaining a basic service set BSS identifier in the PPDU; if the BSS identifier in the PPDU is different from a first BSS identifier, and the BSS identifier in the PPDU is the same as a second BSS identifier, determining whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, contending for an access channel, and communicating with a station other than the target relay in the first BSS. According to still another aspect, an embodiment of the present disclosure provides a computer storage medium, configured to store a computer software instruction used by the foregoing data communication apparatus, and the computer software instruction includes a program designed to execute the foregoing aspects.

In this embodiment of the present disclosure, after receiving a physical layer protocol data unit PPDU, a network node obtains a basic service set BSS identifier in the PPDU; if the BSS identifier in the PPDU is different from a first BSS identifier, and the BSS identifier in the PPDU is the same as a second BSS identifier, the network node determines whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, the network node contends for an access channel, and communicates with a station other than the target relay in the first BSS. In this manner, a data transmission collision problem when spatial reuse is performed between different BSSs can be resolved, so as to implement spatial reuse in the relay network, and improve resource utilization.

BRIEF DESCRIPTION OF THE DRAWINGS

To describe the technical solutions in the embodiments of the present disclosure or in the background more clearly, the following briefly describes the accompanying drawings required for describing the embodiments of the present disclosure or the background.

DETAILED DESCRIPTION

Embodiments of the present disclosure may be applied to a wireless local area network (WLAN). Currently, standards used by the WLAN are IEEE (Institute of Electrical and Electronics Engineers) 802.11 series. Multi-hop relay transmission is introduced in 802.11ah to achieve long-distance transmission. A relay station logically implements two functions: a relay-station (relay-STA) function and a relay-access point (relay-AP) function. When communicating with an associated upper-layer AP, the relay usually acts as a station, (that is, implementing the relay-STA function); and when a station managed by the relay communicates with the relay, the relay usually acts as an access point (that is, implementing the relay-AP function).

The WLAN may include a plurality of basic service sets BSSs, network nodes in the basic service set are stations, and the stations include access point (AP) stations and non-access point stations (Non-AP STA). Each basic service set may include one AP and a plurality of non-AP STAs associated with the AP. After the relay is introduced, because the relay includes two functions, the relay usually belongs to two different BSSs. A relay-STA module of the relay belongs to one BSS, and the relay belongs to the non-access point station in the BSS. A relay-AP module of the relay belongs to another BSS, and the relay belongs to the access point station in the another BSS.

The access point station is also referred to as a wireless access point, a hotspot, or the like. The access point station is an access point used by a mobile subscriber to access a wired network, and is mainly deployed in a family, a building, or a campus, and a typical coverage radius is tens of meters to hundreds of meters. Certainly, the access point station may also be deployed outdoors. The access point station is equivalent to a bridge connecting a wired network and a wireless network. A main function of the access point station is to connect clients of a wireless network together, and then connect the wireless network to an Ethernet network. Specifically, the access point station may be a terminal device or a network device with a Wi-Fi (Wireless Fidelity) chip. Optionally, the access point station may be a device that supports the 802.11ax standard. Further, optionally, the access point station may be a device that supports a plurality of WLAN standards, such as 802.11ac, 802.11n, 802.11g, 802.11b, 802.11a, and 802.11ah.

The non-access point station (Non-AP STA) may be a wireless communications chip, a wireless sensor, or a wireless communications terminal, for example, a mobile telephone that supports a Wi-Fi communication function, a tablet computer that supports a Wi-Fi communication function, a set top box that supports a Wi-Fi communication function, a smart TV that supports a Wi-Fi communication function, an intelligent wearable device that supports a Wi-Fi communication function, a vehicular communications device that supports a Wi-Fi communication function, or a computer that supports a Wi-Fi communication function. Optionally, the non-AP STA may support the 802.11ax standard. Further, optionally, the station supports a plurality of WLAN standards, such as 802.11ac, 802.11n, 802.11g, 802.11b, 802.11a, and 802.11ah.

The relay is a station having an access point station function and a non-access point station function. The relay acts as the access point station in one BSS, and the relay acts as the non-access point station in another BSS.

An existing Wi-Fi technology uses a carrier sense multiple access/collision detection (CSMA/CA) protocol to avoid interference, so that a station that first obtains a channel right of use through contending exclusively occupies channel resources, and other surrounding communication peers may contend for the channel only after the station completes communication. A link being used for communication is better protected in this manner, but spectrum efficiency of the link is greatly limited in ultra-dense networking in 802.11ax. An edge user in an overlapping area of a plurality of BSSs may be interfered with by a plurality of surrounding BSSs, a communication opportunity and a throughput of the edge user may be much lower than that of a center user. Therefore, that the edge user performs spatial reuse in a transmission time of an OBSS communication peer, so as to increase communication opportunities and improve spectrum efficiency is significant in an ultra-dense Wi-Fi networking scenario.

In a spatial reuse technology, a user performs concurrent transmission when receiving an on-going data packet of the OBSS, but a spatial reuse (SR) transmission peer is required to cause no interference on the on-going transmission of the OBSS. To implement the technology, an SR node needs to meet a specific condition to perform spatial reuse. In addition, a clear channel assessment (CCA) and a network allocation vector (NAV) rule of an existing standard also need to be improved to increase spatial reuse opportunities.

The 802.11ax introduces a basic service set (BSS) color field in a physical layer preamble high-efficiency field. The field is used to identify the BSS, and help a receiving station to determine whether a received PPDU comes from the BSS. When a BSS color included in the physical layer preamble high-efficiency field of the PPDU is the same as a BSS color of a BSS at which the receiving station is located, the PPDU is a data packet of the BSS; or when a BSS color included in the physical layer preamble high-efficiency field of the PPDU is different from a BSS color of a BSS at which the receiving station is located, the PPDU is a data packet of the OBSS. Based on the BSS color, the receiving station may use a spatial reuse rule to access the channel, or stop reading the received PPDU in advance, so as to save energy.

Spatial reuse rule: The CCA manner means that in a wireless communications system, before a device needs to send data on a channel, the device first receives data on this channel, and determines whether the channel is occupied by using a received signal strength indicator (RSSI). The RSSI is also referred to as CCA sensitivity. Based on the 802.11 standard, when it is detected that an effective preamble has an RSSI (−82 dBm (decibels per milliwatt)) greater than or equal to a CCA threshold, the CCA indicates that the channel is in a busy state. The CCA threshold used to indicate that the channel is busy is −62 dBm when the preamble is not detected. If the device finds that no other device is sending data on the channel in the CCA manner with a given period of time, the device starts to send data; or if it is found that another device is sending data on the channel, the device performs the process again after a random period of time.

The existing Wi-Fi standard uses a fixed-threshold CCA, and the threshold is relatively low, which may avoid interference to some extent, but also greatly reduces a concurrent probability in case of dense networking. Therefore, to increase spatial reuse opportunities, an OBSS packet detection level (OBSS PD level, OPD) level is provided to detect a signal strength of the OBSS data packet.

The spatial reuse is a key technology for improving a total system throughput and spectrum utilization. After the STA receives the data packet from the OBSS, when a specific condition is met and the SR is enabled, the STA starts the OPD level (OBSS PD level) to perform CCA detection. When a condition that the RSSI is less than the OPD level is met, the STA may contend for the channel to transmit the SR.

Power saving rule: when receiving a BSS color that is included in the physical layer preamble of the PPDU and that is different from a BSS color of the receiving station, the receiving station may stop receiving a subsequent part of the BSS color field of the physical layer preamble of the PPDU (for example, a medium access control (MAC) layer of the PPDU), so as to save power. It should be noted that if the receiving station is the relay, when receiving the PPDU, the receiving station may stop receiving the PPDU only when it is determined that the BSS color carried in the physical layer preamble of the PPDU is different from both the relay-STA of the relay and the BSS color of the BSS at which the relay-AP is located, so as to save power.

In the embodiments of the present disclosure, the BSS identifier is used to uniquely identify one BSS, for example, the BSS identifier may be the BSS color, a MAC address of the AP, or a part of the MAC address. In FIG. 1, for example, the BSS color is used as the BSS identifier for description.

In the embodiments of the present disclosure, the network node may be a station STA, or the network node may be a root access point root AP, or the network node may be a relay.

In the embodiments of the present disclosure, the relay includes a relay-AP module and a relay-STA module, and the two modules belong to different BSSs. In the embodiments of the present disclosure, a same BSS to which the relay and the network node belong is referred to as a first BSS, and another BSS to which the relay belongs is referred to as an extended BSS. As shown in FIG. 1, a relay 1 is used as an example for description, if the network node is the root AP, a relay 1-STA belongs to a BSS 1, and a relay 1-AP belongs to a BSS 2. In the embodiments of the present disclosure, the BSS to which the relay 1-STA and the network node root AP belong is referred to as the first BSS, and the BSS 2 to which the relay 1-AP belongs is referred to as the extended BSS.

Referring to FIG. 1, FIG. 1 is a schematic diagram of a system of a typical WLAN deployment scenario. As shown in the figure, a system architecture of this embodiment includes three layers of network nodes. Certainly, the three layers of network nodes are merely used as an example in this embodiment of the present disclosure, and constitute no limitation on the present disclosure. The present disclosure may include N (N is greater than or equal to 3) layers of network nodes. For example, a STA 1 in FIG. 1 may be a relay 3, and then the relay 3 manages a plurality of STAs. In this way, a four-layer network architecture is constituted.

The network shown in FIG. 1 includes three BSSs (it may be understood that the three BSSs are merely an example and constitute no limitation on the present disclosure). The relay in the figure logically implements two functions: a relay-station (relay-STA) function and a relay-access point (relay-AP) function. When communicating with an associated upper-layer AP (for example, a root AP in the figure), the relay usually acts as a relay-STA; and when a station managed by the relay communicates with the relay, for example, when the STA 1 sends a data packet to a relay 1, the relay 1 acts as a relay-AP. Each relay and a station managed by the relay are referred to as one BSS, for example, the relay 1, the STA 1, and a STA 3 are one BSS.

The network node in this embodiment of the present disclosure may be the root AP, the STA, or the relay in FIG. 1. It should be noted that if the network node is the relay 1, a first BSS may be a BSS 1 in FIG. 1 or a BSS 2 in FIG. 1. A specific method for determining the first BSS may be: determining the first BSS based on a BSS to which a station with which the relay 1 needs to communicate belongs. For example, the relay 1 needs to communicate with the STA 1, and therefore the first BSS is the BSS 2.

In a multi-hop relay network, each BSS has one BSS color, which is used to identify the BSS. The BSS color field is placed in a physical layer preamble signaling field of the PPDU or a MAC header. After receiving the PPDU, the network node may use a spatial reuse rule to improve transmission efficiency of concurrent data packets, so as to improve a network throughput. In addition, based on different BSS colors, the network node may use a power saving rule to stop receiving the PPDU in advance, so as to achieve a power saving effect.

As shown in FIG. 1, a probability of concurrent transmission by stations in the BSS 1, the BSS 2, and the BSS 3 may be improved by using the BSS color. However, the relay may belong to two BSSs at the same time, for example, a relay 1-AP of the relay 1 belongs to the BSS 2, the relay 1-STA belongs to the BSS 1, and therefore, concurrent transmission of a plurality of BSSs based on the BSS color may cause a data transmission collision problem. For example, the relay 1-AP sends a PPDU 1 to the STA 1. In this case, the root AP receives the PPDU 1, but based on that a BSS color carried in a physical layer preamble of the PPDU 1 is determined as a PPDU of the OBSS, when an RSSI of the currently received PPDU 1 meets a condition of being less than an OPD level, and the RSSI of the PPDU 1 meets an SR condition, the root AP may contend for a channel and send data to a station managed by the root AP. If the root AP sends the data to the relay 1-STA, but the relay 1 is sending data at this moment, and cannot receive the data, the data sent by the root AP cannot be received. For another example, the STA 1 sends a PPDU 2 to the relay 1-AP. In this case, the root AP receives the PPDU 2, but based on that a BSS color carried in a physical layer preamble of the PPDU 2 is determined as a PPDU of the OBSS, when an RSSI of the currently received PPDU 2 meets the condition of being less than the OPD level, and the RSSI of the PPDU 2 meets the SR condition, the root AP may contend for a channel and send data to a station managed by the root AP. If the root AP sends the data to the relay 1-STA, in this case, data packets received by the relay 1 at the same time from the STA 1 and the root AP may collide.

In this embodiment of the present disclosure, to resolve the foregoing data transmission collision problem, when spatial reuse is performed, in addition to using the conventional spatial reuse rule for determining, identifiers of extended BSSs to which all relays in the BSS belong further need to be obtained. In this way, when receiving a PPDU of an extended BSS to which a target relay belongs, the network node cannot communicate with the target relay, because a data collision problem may occur.

Figure 2:
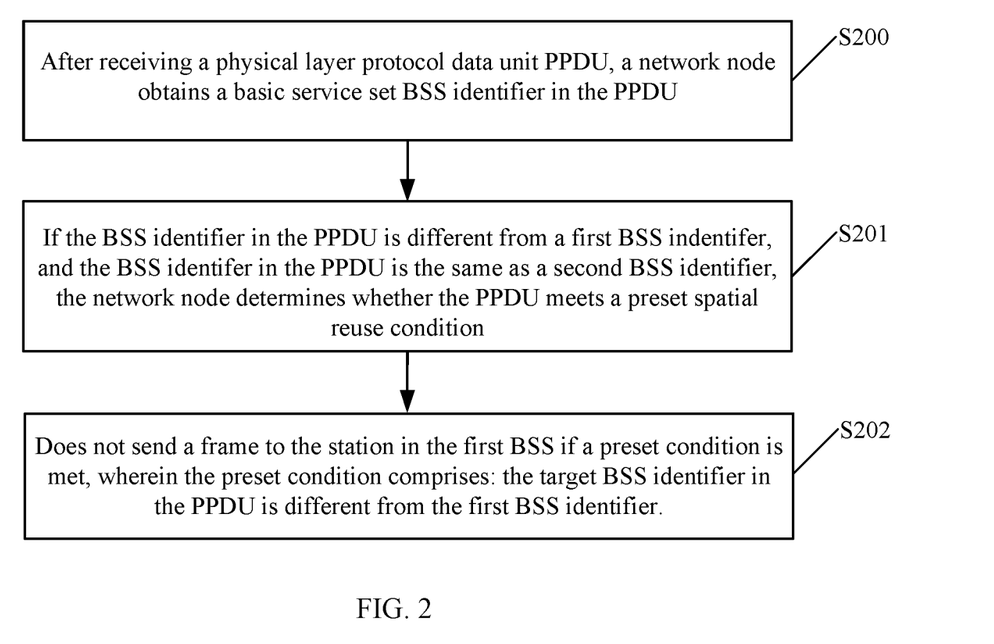
FIG. 2 is a schematic flowchart of a data communication method according to an embodiment of the present disclosure.

Referring to FIG. 2, FIG. 2 is a flowchart of a data communication method according to an embodiment of the present disclosure. The data communication method of this embodiment of the present disclosure is applied to a wireless local area network. The wireless local area network includes a root access point root AP, a relay, and a n STA, where the root AP is associated with a plurality of relays, and each of the plurality of relays is associated with one or more STAs. A network node in this embodiment of the present disclosure may be any station in the wireless local area network (including any one of the root access point root AP, the relay, and the station STA). As shown in the figure, the data communication method of this embodiment of the present disclosure includes the following steps.

S200. After receiving a physical layer protocol data unit PPDU, the network node obtains a basic service set BSS identifier in the PPDU.

In this embodiment of the present disclosure, the network node may include an access point station (for example, a root AP or a relay-AP in FIG. 1) or a non-access point station (for example, a STA or a relay-STA in FIG. 1). The relay may be the access point station relay-AP or the non-access point station relay-STA. The relay has different identities in different BSSs. When receiving the PPDU, the network node obtains, through parsing, a BSS identifier from a physical layer preamble of the PPDU. The BSS identifier in the PPDU is used to represent an identifier of a BSS that the PPDU comes from. It should be noted that if a station that sends the PPDU is the relay, the BSS identifier in the PPDU is used to identify a BSS to which a module of a relay that sends the PPDU belongs. As shown in FIG. 1, if a relay 1 sends the PPDU to an AP in a BSS 1, the BSS identifier included in the PPDU is an identifier of the BSS 1 to which the relay-STA belongs.

Optionally, if the network node is the access point station in the first BSS, before the obtaining a basic service set BSS identifier included in the PPDU, the method further includes:

receiving, by the network node, a preset frame reported by a relay, where the preset frame includes an identifier of an extended BSS to which the relay belongs, and the relay and the network node belong to the first BSS.

Optionally, the preset frame includes any one of a data frame, a management frame, or a control frame.

In this embodiment of the present disclosure, if the network node is the access point station in the first BSS, for example, the root AP of the BSS 1 (the first BSS is the BSS 1) or the relay 1-AP of the BSS 2 (the first BSS is the BSS 2) in FIG. 1, each relay in the first BSS reports, to the access point station (that is, the network node) associated with the relay, an identifier of another BSS to which the relay belongs, that is, an identifier of an extended BSS to which the relay belongs. As shown in FIG. 1, each relay reports, to the network node, a BSS identifier of a BSS at which a relay-AP of the relay is located (for example, the BSS identifier may be a BSS color).

As shown in FIG. 1, if the network node is the root AP of the BSS 1, and the first BSS is the BSS 1, the relay 1 reports, to the root AP, an identifier of an extended BSS to which the relay 1-AP of the relay 1 belongs (that is, an identifier of the BSS 2), and the relay 1-STA belongs to the BSS 1; and the relay 2 reports, to the root AP, an identifier of an extended BSS to which the relay-AP of the relay 2 belongs (that is, an identifier of a BSS 3), and the relay 2-STA belongs to the BSS 1.

Likewise, if the network node is the relay, the relay is the relay-AP in the first BSS, each relay in the first BSS reports, to the network node, an identifier of another BSS at which a relay-AP of the relay is located.

Specifically, optionally, a method in which each relay reports a BSS color to the network node may be: each relay sends the preset frame to the network node by using a relay-STA module of the relay. A MAC header of the preset frame carries the BSS color, so as to notify the network node of the BSS color of the BSS at which the relay-AP of the network node is located. The preset frame may be any one of the data frame, the management frame, or the control frame.

Optionally, if the network node is the non-access point station in the first BSS, before the obtaining a basic service set BSS identifier in the PPDU, the method further includes:

receiving, by the network node, a management frame, where the management frame carries identifiers of extended BSSs to which all relays in the first BSS belong, and the management frame is broadcast by the access point station in the first BSS to which the network node belongs.

In this embodiment of the present disclosure, if the network node is the non-access point station in the first BSS, for example, a STA 0 of the BSS 1 (the first BSS is the BSS 1) or the relay 1-STA in the BSS 1 (the first BSS is the BSS 1) in FIG. 1, or if a station managed by the relay 1-AP in the BSS 2 further includes a relay 3, and a relay 3-STA of the relay 3 belongs to the BSS 2, the network node may be the relay 3-STA in the BSS 2 (the first BSS is the BSS 2).

Each relay in the first BSS reports in advance, to an access point station associated with the relay (which may be the AP or the relay-AP), a BSS color of a BSS at which a relay-AP of the relay is located. Specifically, optionally, the method in which each relay reports a BSS color may be: sending, by using the relay-STA module, the preset frame to the access point station associated with the relay. The preset frame carries a BSS color in a MAC header, so as to notify the relay of the BSS color of the BSS at which the relay-AP of the access point station associated with the relay is located. The preset frame may be the control frame, the data frame, or the management frame.

Figure 3:
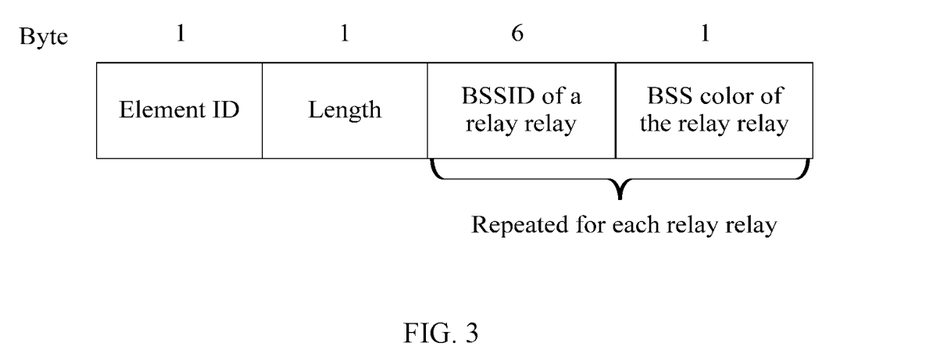
FIG. 3 is a schematic diagram of a BSS color element according to an embodiment of the present disclosure.

The access point station (which may be the root AP or the relay-AP) collects identifiers of extended BSSs to which all relays in the first BSS belong, and then the access point station broadcasts, in the first BSS, BSS colors of BSSs at which relay-APs co-located with all relay-STAs managed by the first BSS are located. Optionally, the broadcast manner may be carrying a BSS color element by using a beacon frame beacon or another management frame. As shown in FIG. 3, FIG. 3 is a schematic diagram of a BSS color element according to an embodiment of the present disclosure. A BSSID of each relay may not be included in the BSS color element. Further, optionally, when the access point station broadcasts the identifiers of extended BSSs to which all the relays in the first BSS belong, if the access point station is the relay-AP, the management frame used for broadcasting may include an identifier of a BSS to which a relay-STA of the relay belongs.

S201. If the identifier in the PPDU is different from a first BSS identifier, and the identifier in the PPDU is the same as a second BSS identifier, the network node determines whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS.

S202. If the PPDU meets the preset spatial reuse condition, the network node contends for an access channel, and communicates with a station other than the target relay in the first BSS.

In this embodiment of the present disclosure, when receiving the PPDU, the network node first needs to determine whether the PPDU is the PPDU of the OBSS, that is, determining whether the BSS identifier carried in the PPDU is the same as the first BSS identifier of the first BSS to which the network node belongs (it should be noted that if the network node is the relay, the first BSS is a BSS to which a station that is to communicate with the relay belongs). If the BSS identifier in the PPDU is different from the first BSS, the PPDU is the PPDU of the OBSS, and further, matching is performed between the BSS identifier in the PPDU and identifiers that are obtained by the network node and that are of extended BSSs to which all relays in the first BSS belong. If the BSS identifier in the PPDU is the same as a second BSS identifier of an extended BSS to which a target relay in all the relays belongs, it is determined that the PPDU is the PPDU of the extended BSS to which the target relay belongs. It should be noted that the target relay is one of all the relays in the first BSS, and the extended BSS to which the target relay belongs can match the BSS identifier in the PPDU.

Determining whether the PPDU meets the preset spatial reuse condition is to determine whether the RSSI of the PPDU meets a condition of being less than an OPD level, and whether the RSSI of the PPDU meets an SR condition. If the PPDU meets the preset spatial reuse condition, to avoid a data transmission collision problem, the network node may contend for an access channel, and communicate with a station other than the target relay in the first BSS. The PPDU comes from the extended BSS to which the target relay belongs, and therefore, the target relay may be receiving data or sending data. If the network node communicates with the target relay at this moment, the data transmission collision problem may be caused.

Further, optionally, when the network node receives the PPDU of the OBSS, and when a BSS color carried in the physical layer preamble of the PPDU is different from identifiers that are collected by the network node and that are of extended BSSs to which all the relays in the first BSS belong, if the received RSSI of the PPDU meets the condition of being less than the OPD level, and the RSSI of the PPDU meets the SR condition, the network node may contend for a channel and send data to any station in the first BSS.

It should be noted that, if the network node is the STA or the root AP, and an OBSS PPDU is received (the BSS color of the received PPDU does not match the BSS color of the BSS at which the STA is located), the PPDU receiving may be stopped to save power. If the network node is the relay, when receiving the PPDU, the network node may stop receiving the PPDU only when it is determined that the BSS color carried in the physical layer preamble of the PPDU is different from both the BSS color of the BSS at which the relay-STA of the relay is located and the BSS color of the BSS at which the relay-AP is located, so as to save power.

Further, optionally, the PPDU includes a spatial reuse prohibition field.

Therefore, in this embodiment of the present disclosure, before contending for the access channel, the network node may further determine whether a value of the spatial reuse prohibition field in the PPDU is a spatial reuse prohibition identifier. If the value of the spatial reuse prohibition field in the PPDU is the spatial reuse prohibition identifier, the channel contention is prohibited; or if the value of the spatial reuse prohibition field in the PPDU is not the spatial reuse prohibition identifier, contention for access channel is allowed.

In this embodiment of the present disclosure, in a multi-hop relay network, BSSs have different BSS colors, and the BSS colors are used only for power saving. A specific operation step is: a physical layer preamble of a PPDU sent by a station in each BSS includes one spatial reuse prohibition field, and the field may be set to the spatial reuse prohibition identifier. A station of another BSS does not perform spatial reuse after receiving the PPDU, so as to avoid a collision caused by the spatial reuse.

In another optional implementation, the relay network includes at least two basic service sets BSSs, and BSS identifiers of the at least two BSSs are the same. Therefore, spatial reuse may not be performed when each station finds, through parsing, that the BSS color carried in the PPDU is the same as a BSS color of a BSS to which the station belongs. It should be noted that BSS colors may be different in different relay networks, that is, spatial reuse is allowed in different relay networks.

In this embodiment of the present disclosure, after receiving a physical layer protocol data unit PPDU, a network node obtains a basic service set BSS identifier in the PPDU; if the BSS identifier in the PPDU is different from a first BSS identifier, and the BSS identifier in the PPDU is the same as a second BSS identifier, the network node determines whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, the network node contends for an access channel, and communicates with a station other than the target relay in the first BSS. In this manner, a data transmission collision problem when spatial reuse is performed between different BSSs can be resolved, so as to implement spatial reuse in the relay network, and improve resource utilization.

Figure 4:
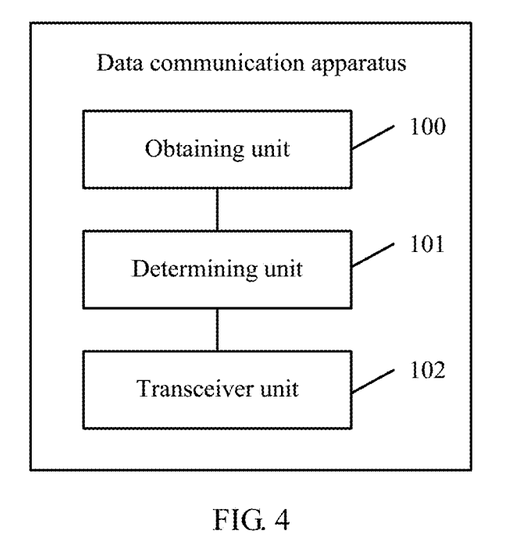
FIG. 4 is a schematic structural diagram of a data communication apparatus according to an embodiment of the present disclosure.
Figure 5:
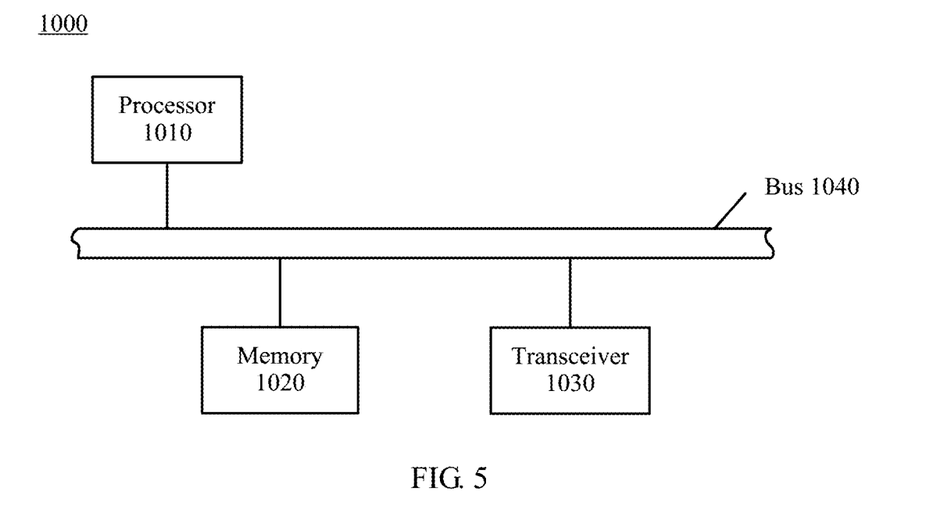
FIG. 5 is a schematic structural diagram of another data communication apparatus according to an embodiment of the present disclosure.

With reference to FIG. 4 and FIG. 5, the following describes specific implementation of a data communication apparatus provided in this embodiment of the present disclosure.

Referring to FIG. 4, FIG. 4 is a schematic structural diagram of a data communication apparatus according to an embodiment of the present disclosure. The data communication apparatus may be applied to any network node in a wireless local area network. The wireless local area network includes a root access point root AP, a relay, and a station STA, where the root AP is associated with a plurality of relays, and each of the plurality of relays is associated with one or more STAs. The network node may be the station STA, the root access point root AP, the relay, or any network node in FIG. 1. As shown in FIG. 4, the data communication apparatus in this embodiment includes an obtaining unit 100, a determining unit 101, and a transceiver unit 102.

The obtaining unit 100 is configured to: after receiving a physical layer protocol data unit PPDU, obtain a basic service set BSS identifier in the PPDU.

The determining unit 101 is configured to: if the BSS identifier in the PPDU is different from a first BSS identifier, and the BSS identifier in the PPDU is the same as a second BSS identifier, determine whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS.

The transceiver unit 102 is configured to: if the PPDU meets the preset spatial reuse condition, contend for an access channel, and communicate with a station other than the target relay in the first BSS.

Optionally, if the network node is the access point station in the first BSS, the transceiver unit is further configured to receive a preset frame reported by a relay, where the preset frame includes an identifier of an extended BSS to which the relay belongs, and the relay and the network node belong to the first BSS.

Optionally, the preset frame includes any one of a data frame, a management frame, or a control frame.

Optionally, if the network node is the non-access point station in the first BSS, the transceiver unit is further configured to receive a management frame, where the management frame carries identifiers of extended BSSs to which all relays in the first BSS belong, and the management frame is broadcast by the access point station in the first BSS to which the network node belongs.

The identifiers that are carried in the foregoing management frame and that are of the extended BSSs to which all the relays in the first BSS belong are identifiers that are pre-reported by the relays in the first BSS to the access point station.

Optionally, the PPDU includes a spatial reuse prohibition field.

The determining unit is further configured to: read a value of the spatial reuse prohibition field; determine whether the value of the spatial reuse prohibition field in the PPDU is a spatial reuse prohibition identifier; and if the value of the spatial reuse prohibition field in the PPDU is the spatial reuse prohibition identifier, prohibit contention for the channel.

In this embodiment of the present disclosure, after receiving a physical layer protocol data unit PPDU, a network node obtains a basic service set BSS identifier in the PPDU; if the BSS identifier in the PPDU is different from a first BSS identifier, and the BSS identifier in the PPDU is the same as a second BSS identifier, the network node determines whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, the network node contends for an access channel, and communicates with a station other than the target relay in the first BSS. In this manner, a data transmission collision problem when spatial reuse is performed between different BSSs can be resolved, so as to implement spatial reuse in the relay network, and improve resource utilization.

Referring to FIG. 5, FIG. 5 is a schematic structural diagram of another data communication apparatus according to an embodiment of the present disclosure. The data communication apparatus may be applied to any network node in a wireless local area network. The wireless local area network includes a root access point root AP, a relay, and a station STA, where the root AP is associated with a plurality of relays, and each of the plurality of relays is associated with one or more STAs. The network node may be the station STA, the root access point root AP, the relay, or any network node in FIG. 1. As shown in FIG. 5, the data communication apparatus 1000 includes a processor 1010, a memory 1020, and a transceiver 1030. The network node to which the data communication apparatus is applied may be the STA, the root AP, or the relay shown in FIG. 1.

Specifically, the processor 1010 controls an operation of the data communication apparatus 1000. The memory 1020 may include a read only memory and a random access memory, and provides an instruction and data for the processor 1010. The processor may be a general purpose processor, a digital signal processor, an application-specific integrated circuit, a field programmable gate array, or another programmable logic device. A part of the memory 1020 may further include a non-volatile random access memory (NVRAM). All components of the data communication apparatus 1000 are coupled together by using a bus 1040. In addition to a data bus, the bus system 1040 includes a power bus, a control bus, and a status signal bus. However, for clear description, various buses in the figure are marked as the bus system 1040. It should be noted that the foregoing description of the structure of the data communication apparatus may be applied to a subsequent embodiment.

The processor 1010 is configured to: after receiving a physical layer protocol data unit PPDU, obtain a basic service set BSS identifier in the PPDU.

The processor 1010 is further configured to: if the BSS identifier in the PPDU is different from a first BSS identifier, and the BSS identifier in the PPDU is the same as a second BSS identifier, determine whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS.

The transceiver 1030 is configured to: if the PPDU meets the preset spatial reuse condition, contend for an access channel, and communicate with a station other than the target relay in the first BSS.

Optionally, if the network node is the access point station in the first BSS, before the processor 1010 obtains the basic service set BSS identifier in the PPDU, the transceiver 1030 is further configured to receive a preset frame reported by a relay, where the preset frame includes an identifier of an extended BSS to which the relay belongs, and the relay and the network node belong to the first BSS.

The preset frame includes any one of a data frame, a management frame, or a control frame.

Optionally, if the network node is the non-access point station in the first BSS, before the processor 1010 obtains the basic service set BSS identifier in the PPDU, the transceiver 1030 is further configured to receive a management frame, where the management frame carries identifiers of extended BSSs to which all relays in the first BSS belong, and the management frame is broadcast by the access point station in the first BSS to which the network node belongs.

Optionally, the identifiers that are carried in the management frame and that are of the extended BSSs to which all the relays in the first BSS belong are identifiers that are pre-reported by the relays in the first BSS to the access point station.

Further, optionally, the PPDU includes a spatial reuse prohibition field.

Before the transceiver contends for the access channel, the processor 1010 is further configured to: read a value of the spatial reuse prohibition field; determine whether the value of the spatial reuse prohibition field in the PPDU is set to a spatial reuse prohibition identifier; and if the value of the spatial reuse prohibition field in the PPDU is set to the spatial reuse prohibition identifier, prohibit contention for the channel.

In this embodiment of the present disclosure, after receiving a physical layer protocol data unit PPDU, a network node obtains a basic service set BSS identifier in the PPDU; if the BSS identifier in the PPDU is different from a first BSS identifier, and the BSS identifier in the PPDU is the same as a second BSS identifier, the network node determines whether the PPDU meets a preset spatial reuse condition, where the first BSS identifier is an identifier of a first BSS to which the network node belongs, the second BSS identifier is an identifier of an extended BSS to which a target relay belongs, and the target relay and the network node belong to the first BSS; and if the PPDU meets the preset spatial reuse condition, the network node contends for an access channel, and communicates with a station other than the target relay in the first BSS. In this manner, a data transmission collision problem when spatial reuse is performed between different BSSs can be resolved, so as to implement spatial reuse in the relay network, and improve resource utilization.

It may be understood that, for specific implementations of the components in the foregoing data communication apparatus, reference may be further made to relevant descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: a read only memory (ROM), a random access memory (RAM), or various media that can store program code such as a magnetic disk or an optical disc.

What is claimed is:

1. A data communication apparatus, applied in a wireless local area network, wherein the apparatus comprises: a processor and a memory configured to store computer executable program code, the program code includes an instruction, and when the processor executes the instruction, the instruction enables the data communication apparatus to perform the following operations:

receiving a frame reported by a station (STA) associated with the communication apparatus, wherein the communication apparatus and the STA belong to a first basic service set (BSS) having a first BBS identifier, the frame comprises an second BSS identifier;

receiving a physical layer protocol data unit (PPDU), the PPDU comprises a physical layer preamble high-efficiency field, wherein the field contains a target BSS identifier; and avoiding sending a frame to the station in the first BSS when:

the target BSS identifier in the PPDU is the same as the second BSS identifier, the target BSS identifier in the PPDU is different from the first BSS identifier, and a preset condition specifying: a received signal strength indicator is less than an overlapping BSS (OBSS) packet detection level (OBSS PD level) is met.

2. The apparatus according to claim 1, wherein second BSS identifier is an identifier of a second BSS.

3. The apparatus according to claim 1, wherein PPDU comprises a spatial reuse prohibition field; and the preset condition further comprises:

a value of the spatial reuse prohibition field in the PPDU is not a spatial reuse prohibition identifier.

4. The apparatus according to claim 1, wherein not sending a frame to the station in the first BSS if the target BSS identifier in the PPDU is the same as the second BSS identifier and a preset condition is met, wherein the preset condition comprises: the target BSS identifier in the PPDU is different from the first BSS identifier, comprises:

sending a frame to another station other than the station in the first BSS if the target BSS identifier in the PPDU is the same as the second BSS identifier and a preset condition is met, wherein the preset condition comprises: the target BSS identifier in the PPDU is different from the first BSS identifier.

5. The apparatus according to claim 1, wherein the operations further comprises:

sending a frame to the STA in the first BSS, if the target BSS identifier in the PPDU is different from the second BSS identifier and the preset condition is met.

6. The apparatus according to claim 1, wherein the frame is any one of a data frame, a management frame or a control frame.

7. The apparatus according to claim 1, wherein the communication apparatus is applied into an access point in the first BSS.

8. The apparatus according to claim 1, wherein the STA is a none access point station.

9. A computer readable non-transitory storage medium, wherein the computer readable storage medium stores computer program, when the program runs by an access point, the following operations are performed:

receiving a frame reported by a station (STA) associated with the AP, wherein the AP and the STA belong to a first basic service set (BSS) having a first BBS identifier, the frame comprises an second BSS identifier;

receiving a physical layer protocol data unit (PPDU), the PPDU comprises a physical layer preamble high-efficiency field, wherein the field contains a target BSS identifier; and avoiding sending a frame to the station in the first BSS when:

the target BSS identifier in the PPDU is the same as the second BSS identifier the target BSS identifier in the PPDU is different from the first BSS identifier, and a preset condition specifying: a received signal strength indicator is less than an overlapping BSS (OBSS) packet detection level (OBSS PD level) is met.

10. The computer readable storage medium according to claim 9, wherein the second BSS identifier is an identifier of a second BSS to which the STA belongs.

11. The computer readable storage medium according to claim 9, wherein the PPDU comprises a spatial reuse prohibition field; and the preset condition further comprises:

a value of the spatial reuse prohibition field in the PPDU is not a spatial reuse prohibition identifier.

12. The computer readable storage medium according to claim 9, wherein the operations further comprises:

sending a frame to another station other than the station in the first BSS if the target BSS identifier in the PPDU is the same as the second BSS identifier and a preset condition is met, wherein the preset condition comprises: the target BSS identifier in the PPDU is different from the first BSS identifier.

13. The computer readable storage medium according to claim 9, wherein the operations further comprises:

sending a frame to the STA in the first BSS, if the target BSS identifier in the PPDU is different from the second BSS identifier and the preset condition is met.

14. The computer readable storage medium according to claim 9, wherein the frame is any one of a data frame, a management frame or a control frame.

15. The computer readable storage medium according to claim 9, wherein the STA is an none access point station.

16. A data communication method for use in a wireless local area network comprising a access point (AP), and a station (STA), wherein the AP is associated with one or more STAs, the method comprising:

receiving, a frame reported by a station (STA) associated with a communication apparatus, wherein the communication apparatus and the STA belong to a first basic service set (BSS) having a first BBS identifier, the frame comprises an second BSS identifier;

receiving, a physical layer protocol data unit (PPDU), the PPDU comprises a physical layer preamble high-efficiency field, wherein the field contains a target BSS identifier; and avoiding sending a frame to the station in the first BSS when:

the target BSS identifier in the PPDU is the same as the second BSS identifier, the target BSS identifier in the PPDU is different from the first BSS identifier, a preset condition specifying: a received signal strength indicator is less than an overlapping BSS (OBSS) packet detection level (OBSS PD level) is met.

17. The method according to claim 16, wherein the second BSS identifier is an identifier of a second BSS.

18. The method according to claim 16, wherein the PPDU comprises a spatial reuse prohibition field; and the preset condition further comprises:

a value of the spatial reuse prohibition field in the PPDU is not a spatial reuse prohibition identifier.

19. The method according to claim 16, wherein the method further comprises:

sending a frame to another station other than the station in the first BSS if the target BSS identifier in the PPDU is the same as the second BSS identifier and a preset condition is met, wherein the preset condition comprises: the target BSS identifier in the PPDU is different from the first BSS identifier.

20. The method according to claim 16, wherein the method further comprising:

sending, a frame to the STA in the first BSS, if the target BSS identifier in the PPDU is different from the second BSS identifier and the preset condition is met.

21. The method according to claim 16, wherein the frame is any one of a data frame, a management frame or a control frame.

22. The method according to claim 16, wherein the communication apparatus is applied into an access point in the first BSS.

* * * * *